L. A. WATSON.
SYSTEM OF ELECTRICAL DISTRIBUTION.
APPLICATION FILED SEPT. 19, 1919.
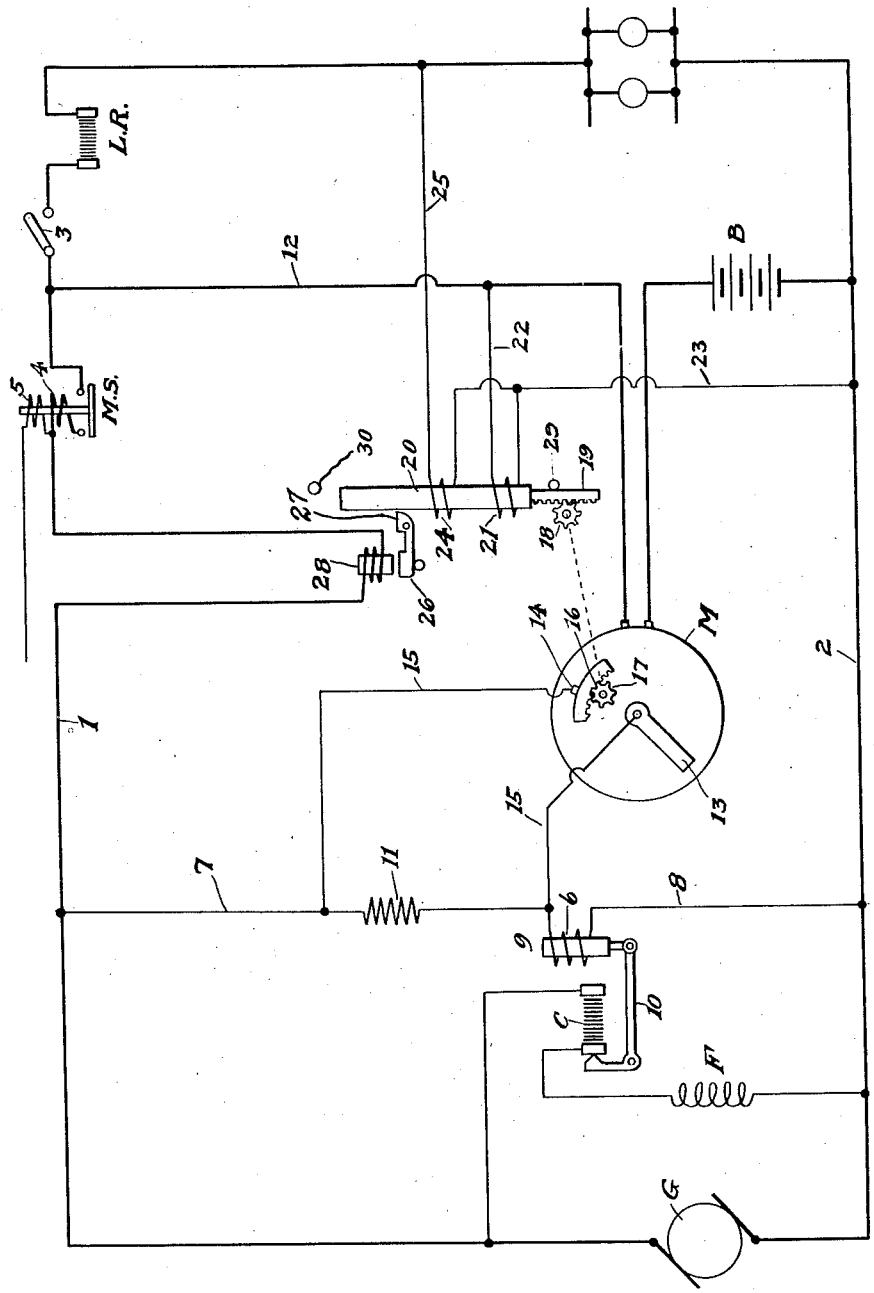

UNITED STATES PATENT OFFICE.

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,331.  Specification of Letters Patent.  Patented Aug. 30, 1921.

Application filed September 19, 1919. Serial No. 325,005.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and more particularly to an improved car lighting system wherein an axle-driven variable speed generator is associated to charge a storage battery and / or supply lamps, and wherein the output of the generator is regulated to compensate for speed changes and changes in battery conditions.

It is an object of the invention to provide a simple and efficient system of the character mentioned wherein the charging current to the battery is terminated for the prevention of over-charge at a time controlled by an automatic device responsive to battery voltage.

A further object is to provide electro-responsive regulating apparatus for a variable speed generator, which apparatus possesses features of functional advantage, as will be noted.

Other objects and advantages will be in part obvious and in part pointed out hereinafter in connection with the following description of the accompanying drawing, which illustrates an exemplary embodiment of the invention, and wherein is shown a simple wiring diagram of the improved system.

Referring more particularly to the drawing, there is represented an axle-driven variable speed generator G having a shunt field winding F, which latter includes in series a regulating resistance, such as a carbon pile C. The generator is adapted for connection by mains 1 and 2 to charge a storage battery B and to supply lamps L. A lamp switch 3 may be provided to control the lamp circuit, and a lamp regulator LR including a variable resistance employed to govern the voltage constancy applied to the lamps when current is furnished by the generator or by the battery. A conventional automatic main switch MS is positioned in the line 1 and actuated by current coil 4 and voltage coil 5 designed to close the switch when and while the voltage of the generator exceeds a predetermined value, and to open the switch when the voltage of the generator, typically at a train stop, decreases below a predetermined value.

The regulator for the generator includes a voltage coil 6 connected across the mains 1 and 2 by leads 7 and 8 and acting by pull on a core 9 attached to bell crank lever 10 to vary the degree of compression of the carbon pile C and maintain relative constancy of the generator voltage as against speed changes and as against gradual changes in counter E. M. F. of the battery over an extended period of charge. An element of resistance 11 is included in series with the regulating coil 6 and is arranged for control to be excluded from said circuit after the charging is substantially completed by an ampere hour meter M positioned in the battery branch 12 and having a movable contact 13 traveling counter-clockwise on charge to engage a terminal contact 14 for closing a break in shunt 15 about resistance 11 and thereby relatively increasing the effect of coil 6 and reducing the value of the generator voltage to stop the charge. Terminal contact 14 of the meter is arranged for relative movement dependent on an automatic device influenced by the voltage of the battery on discharge or on open circuit. As shown, contact 14 is arranged to travel with a segment gear 16 in mesh with a pinion 17, the latter turning with a pinion 18 in mesh with a rack 19 which constitutes the lower end of a core 20 of the automatic device referred to. The position of the core 20 is established by a voltage coil 21 permanently connected across the battery by lines 22 and 23 and by a coil 24, permanently connected across the lamps by lines 25 and 23. In order, however, to insure the functional effectiveness of the coils 21 and 24 only during the periods that the latter are influenced by the battery voltage as distinct from the generator voltage, there is provided means to hold the core 20 against movement while the main switch MS is closed, and therefore while the battery or the lamps are being supplied by the generator. In the figure there is provided a lever 26 pivoted adjacent an end 27 capable of wedging against the core 20, or freeing said core when, respectively, the opposite end of the lever is attracted by a magnet including a winding 28 or is released by said magnet.

Assuming the generator voltage to be low and the main switch MS open, core 20 is released by the lever 26 and its position is established by the action of coil 21 if the battery is on open circuit, or by the action of coils 21 and 24 together, if the battery is on discharge. These coils are so designed as to balance the core against one of the stops 29, 30, or intermediate the same in accordance with the condition of the battery, as indicated by the measurement of its voltage. Dependent on such voltage the position of the core 20 causes movement of the meter contact 14 clockwise if the battery is indicated at sub-normal, and counter-clockwise if the battery is indicated at normal. Assuming the battery sub-normal (for example, due to the presence of a dead cell), at a train stop, or an opening of the main switch MS prior to completion of charge, the meter contact 14 is moved so that, on the re-building of generator voltage the re-closure of the main switch and the resumption of charging of the battery, the short circuit 15 about the resistance 11 is established at the end of a lesser number of ampere hours charge. That is to say, for example, if the automatic device, including coils 21 and 24 responsive to battery voltage at one of the recurring intervals, indicates such a sub-normal battery that the value of generator voltage constancy to be maintained by the regulator after the exclusion of resistance 11 would still continue an objectionable, though reduced, current, by the present invention the automatic device acts to establish the lower level of generator voltage constancy to be maintained by the regulator at an interval prior to the normal completion of the charge. As a result the reduced charging current is brought into effect earlier and the period of further charge at the reduced rate without the objectionable results of overcharging is greatly extended.

It is to be understood that certain features of the invention as described are susceptible of modification and combination in systems employing regulators of other character, and that such modifications and combinations can be effected without sacrifice of certain advantages of this invention and without departure from the scope of the appended claims.

Having described my invention, what I claim as new and desire to secure by Letters Patent is:

1. In a car lighting system, in combination, a variable speed generator, a battery adapted for connection to be charged thereby, electro-responsive regulating means for governing the generator voltage, and automatic means including an ampere hour meter to affect said regulator after a variable amount of measured current has been delivered to said battery for reducing the subsequent standard of voltage regulation.

2. In combination, a variable speed generator, a battery adapted for connection to be charged thereby, electro-responsive regulating means for the generator, and automatic means including an ampere hour meter to affect said regulator after said battery has been charged to a variable degree dependent on the battery voltage during the final period of charging.

3. In combination, a variable speed generator, a battery adapted for connection to be charged thereby, a regulator for said generator including a voltage coil tending when effective to maintain relative constancy of generator voltage as against speed changes and as against gradual changes in the counter E. M. F. of said battery, means indicative of the state of battery charge by measurement of the charging and discharging current adapted to affect said regulator for reducing the value of voltage thereafter maintained by the latter, and means indicative of the condition of the battery by measurement of the battery voltage to govern the time of action of said first-mentioned means to affect said regulator.

4. In combination, a variable speed generator, a battery adapted for connection to be charged thereby, a regulator for said generator including a voltage coil tending when effective to maintain relative constancy of generator voltage as against speed changes and as against gradual changes in the counter E. M. F. of said battery, means indicative of the state of battery charge by measurement of the charging and discharging current adapted to affect said regulator for reducing the value of voltage thereafter maintained by the latter, and means indicative at intervals of the condition of the battery by measurement of the battery voltage (as distinct from the generator voltage) to govern the time of action of said first-mentioned means to affect said regulator.

5. In combination, a variable speed generator, a battery for connection to be charged thereby, a regulator for said generator including a voltage coil tending when effective to maintain relative constancy of generator voltage, a resistance adapted for inclusion in the circuit of said coil under certain conditions and for exclusion from said circuit under other conditions, an ampere hour meter indicative of the state of battery charge by measurement of the charging and discharging current adapted to govern the exclusion and inclusion of said resistance, and auxiliary means associated with said meter and operative only during a period of regulating ineffectiveness of said regulator to govern the time of action of said meter to exclude said resistance from the circuit of said coil.

6. In combination, a variable speed generator, a battery adapted for connection to be charged thereby, a regulator for said generator including a voltage coil tending when effective to maintain relative constancy of generator voltage, a resistance adapted for inclusion in the circuit of said coil and for exclusion from said circuit, an ampere hour meter indicative of the state of battery charge by measurement of the charging and discharging current adapted to effect exclusion of said resistance from the circuit of said coil toward the end of charge, and an automatic device including a coil responsive to battery voltage and coöperable with said meter to determine the time in the charging of said battery at which said resistance is to be excluded from the circuit of said coil.

In testimony whereof I affix my signature, in the presence of two witnesses.

LEONARD A. WATSON.

Witnesses:
HELEN M. SEAMANS,
DAVID A. WOODCOCK.